United States Patent
Lomba et al.

(10) Patent No.: US 8,064,754 B2
(45) Date of Patent: Nov. 22, 2011

(54) METHOD AND COMMUNICATION APPARATUS FOR REPRODUCING A MOVING PICTURE, AND USE IN A VIDEOCONFERENCE SYSTEM

(75) Inventors: Vincent Lomba, Houilles (FR); Stéphane Dufosse, Cormeilles en Parisis (FR)

(73) Assignee: Imerj, Ltd., Grand Cayman (KY)

( * ) Notice: Subject to any disclaimer, the term of this patent is extended or adjusted under 35 U.S.C. 154(b) by 1400 days.

(21) Appl. No.: 11/594,138

(22) Filed: Nov. 8, 2006

(65) Prior Publication Data

US 2007/0182865 A1    Aug. 9, 2007

(30) Foreign Application Priority Data

Nov. 8, 2005  (EP) ...................................... 05110487

(51) Int. Cl.
   *H04N 5/928*  (2006.01)
(52) U.S. Cl. ...................................... 386/338
(58) Field of Classification Search .................. 386/200, 386/223, 224, 328, 338
   See application file for complete search history.

(56) References Cited

U.S. PATENT DOCUMENTS

| | | | |
|---|---|---|---|
| 5,335,011 A | 8/1994 | Addeo et al. | |
| 5,548,346 A | 8/1996 | Mimura et al. | |
| 6,330,022 B1 * | 12/2001 | Seligmann | 348/14.08 |
| 6,483,532 B1 | 11/2002 | Girod | |
| 6,614,465 B2 * | 9/2003 | Alexander et al. | 348/14.05 |
| 7,382,885 B1 * | 6/2008 | Kim et al. | 381/17 |
| 2002/0039421 A1 * | 4/2002 | Kirkeby | 381/17 |
| 2003/0053680 A1 | 3/2003 | Lin et al. | |

FOREIGN PATENT DOCUMENTS

| | | |
|---|---|---|
| EP | 1 515 570 | 3/2005 |
| WO | 97/49244 | 12/1997 |
| WO | 03/058518 | 7/2003 |

* cited by examiner

*Primary Examiner* — Huy T Nguyen
(74) *Attorney, Agent, or Firm* — Marsh Fischmann & Breyfogle LLP

(57) ABSTRACT

The invention relates to a method for reproducing a moving picture composed of a succession of images and of monophonic sounds, comprising the steps of: determining spatial location of at least one zone in motion within said moving picture to be reproduced by analyzing successive images; identifying said zone in motion as corresponding to a source (P3) from which sound is originated; and reproducing said succession of images on a display (20) and corresponding sounds on at least one left loud speaker (21) and one right loud speaker (22), while applying to said sounds at least an audio 3D effect as a function of said spatial location.

15 Claims, 1 Drawing Sheet

METHOD AND COMMUNICATION APPARATUS FOR REPRODUCING A MOVING PICTURE, AND USE IN A VIDEOCONFERENCE SYSTEM

The present invention relates to a method and a communication apparatus for reproducing a moving picture composed, on the one hand, of a succession of images captured by a camera, and on the other hand, of monophonic sounds captured simultaneously with said images.

The problem of such moving picture at the time of reproducing said moving picture on a classical communication apparatus provided with a display and loudspeakers ties in the fact that people who view the moving picture are not able to correctly identify which zones on the displayed images are responsible of the sounds.

However, it is important for human to be able to spatially correlate the sound heard with what is seen at the same time in order to completely understand the scene.

The above-mentioned problem is mostly due to the fact that captured sounds are monophonic.

One possible solution for this problem could be the use of a multi-track encoding system with several microphones at the time moving picture is captured, and the use of multi-channels for sound in the communication apparatus on which said moving picture is reproduced. However, this solution raises several other problems:

first, it is a costly solution since recorder must be equipped with several microphones;
in addition, using multi-channels implies a huge bandwidth increase;
the solution cannot be used for cases where standard imposes the use of monophonic sounds, such as videoconference systems, or transmission of TV's programs on mobile phones ("mobile TV").

The aim of the invention is to remedy the above drawback by proposing a costliness solution enabling a good reproduction of a moving picture, although this moving picture is composed of monophonic sounds.

To this aim, an object of the present invention is to provide a method for reproducing a moving picture composed, on the one hand, of a succession of images captured by a camera, and on the other hand, of monophonic sounds captured simultaneously with said images, characterized in that it comprises the following steps:

Determining spatial location of at least one zone in motion within said moving picture to be reproduced by analyzing successive images;
Identifying said zone in motion as corresponding to a source from which sound is originated;
Reproducing said succession of images on a display and corresponding sounds on at least one left loud speaker and one right loud speaker, while applying to said sounds at least an audio 3D effect as a function of said spatial location.

In one possible embodiment, said step of determining spatial location of at least one zone in motion further may comprise the step of comparing successive images and determining at least two coordinates of said zone in a 2D-referential corresponding to displayed images.

Additionally, said step of determining spatial location of at least one zone in motion within said moving picture may comprise the step of detecting motion of mouths of people captured in the moving picture and the step of determining spatial locations of zones corresponding to detected mouth—s motions.

Step of applying to sounds an audio 3D effect may consist in adapting the relative gains of left and right loudspeakers as a function of the spatial location, and/or in adapting the relative phases and time delays of left and right loudspeakers as a function of the spatial location, and/or in adapting the frequency gain of left and/or right loudspeakers as a function of the spatial location.

Another object of the invention relates to the use of the method according to anyone of the preceding claims in a videoconference system, characterized in that said moving picture to be reproduced has been captured by a videoconference transmitter comprising said camera and a microphone for capturing monophonic sounds, and in that said step of determining spatial location through said step of reproducing are performed at the level of a videoconference receiver comprising said display and said left and right loudspeakers.

A third object of the invention is a communication apparatus comprising a display, at least one left loudspeaker and one right loudspeaker for reproducing a moving picture composed, on the one hand, of a succession of images captured by a camera, and on the other hand, of monophonic sounds captured simultaneously with said images, characterized in that it further comprises software means for:

Determining spatial location of at least one zone in motion within said moving picture to be reproduced by analyzing successive images;
Identifying said zone in motion as corresponding to a source from which sound is originated;
Reproducing said succession of images on said display and corresponding sounds on said left and right loud speakers while applying to said sounds at least an audio 3D effect as a function of said spatial location.

Features and advantages of the invention will become apparent from the following description of the invention given by way of non-limiting examples only and with reference to the accompanying drawings, in which.

The invention will be now described in the particular case of the videoconference. However, the invention can interest other field of use where the captured sounds linked to a moving picture are monophonic.

Figure 1:
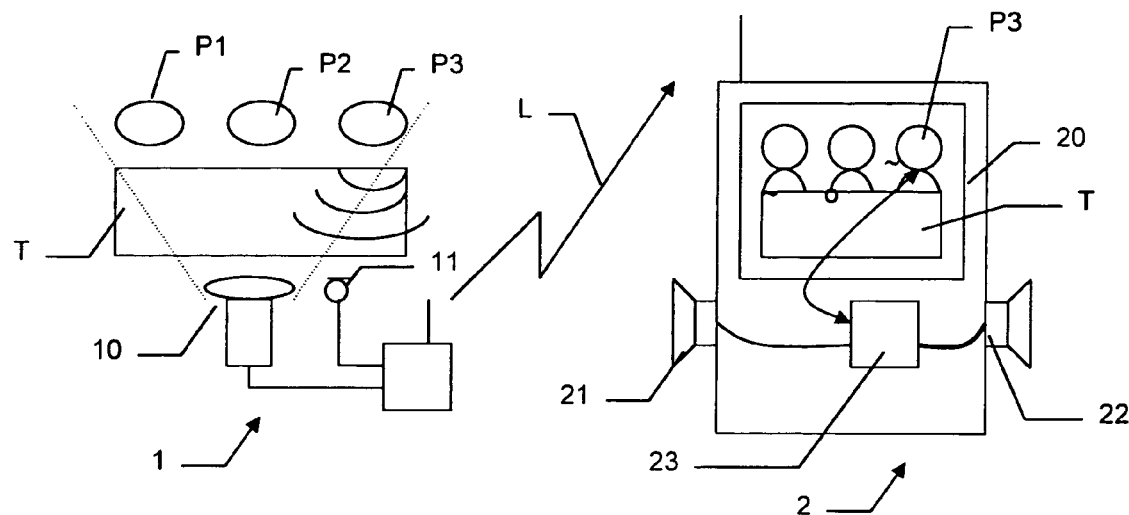
FIG. 1 shows schematically a videoconference system with its transmitter and its receiver, implementing the method according to the present invention.

On the left part of FIG. 1 is represented a videoconference transmitter 1 of the videoconference system used for capturing the moving picture to be reproduced. Transmitter 1 comprises a camera 10 for capturing a scene as a succession of images, and a microphone 11 for capturing monophonic sounds.

The scene is constituted here of three persons P1, P2 and P3, in front of a table T.

Moving picture thus obtained is then transmitted, via a wireless link L, to a remote receiver 2. The transmission could however also be made via a wired link.

Receiver 1 is a communication apparatus comprising a display 20 on which succession of images captured by camera 10 are to be displayed, and at least two loudspeakers, a left loudspeaker 21, and a right loudspeaker 22, which locations on the apparatus lead to a stereophonic effect.

Let's assume now that during the scene which is captured on the left part of FIG. 1, P3 is speaking. According to the method of the invention, communication apparatus 2 is capable of reproducing the scene on display 20 and corresponding sounds on loudspeakers 21 and 22, while applying to said sounds an audio 3D effect thanks to which people viewing camera picture reproduced on apparatus 1 will know that sounds heard come from P3 which is seen on the right part of display 20. This is made possible thanks to software means 23 of apparatus 2 which implement the method of the invention according to the following steps:

Determining spatial location of at least one zone in motion within said moving picture to be reproduced by analyzing successive images; In the example shown, this will correspond for instance to a detection of the motion of mouths for captured people P1 to P3 and to a determination of the spatial location of these detected motions. Since only P3 is speaking, mouth's motion will be detected on the corresponding zone of image displayed on display 20. The step can consist in determining at least two coordinates of said zone in a 2D referential corresponding to displayed images. Alternatively, the step can consist in giving an indication of the spatial location (for instance right side of the image);

Identifying said zone in motion as corresponding to a source from which sound is originated; in the example shown, since only P3 is speaking, this will naturally lead to consider that zone corresponding to P3 is the source of the heard sound. In case of multiple zones detected at the previous step, it may be necessary to apply some rules in order to choose zones which are the most likely sources of heard sounds;

Reproducing said succession of images on display 20 and corresponding sounds on left loud speaker 21 and right loud speaker 22, while applying to said sounds at least an audio 3D effect as a function of said spatial location. In the present case, the viewers must have the impression that sound comes from the right, which is a true spatial correlation with the seen image.

Figure 2:
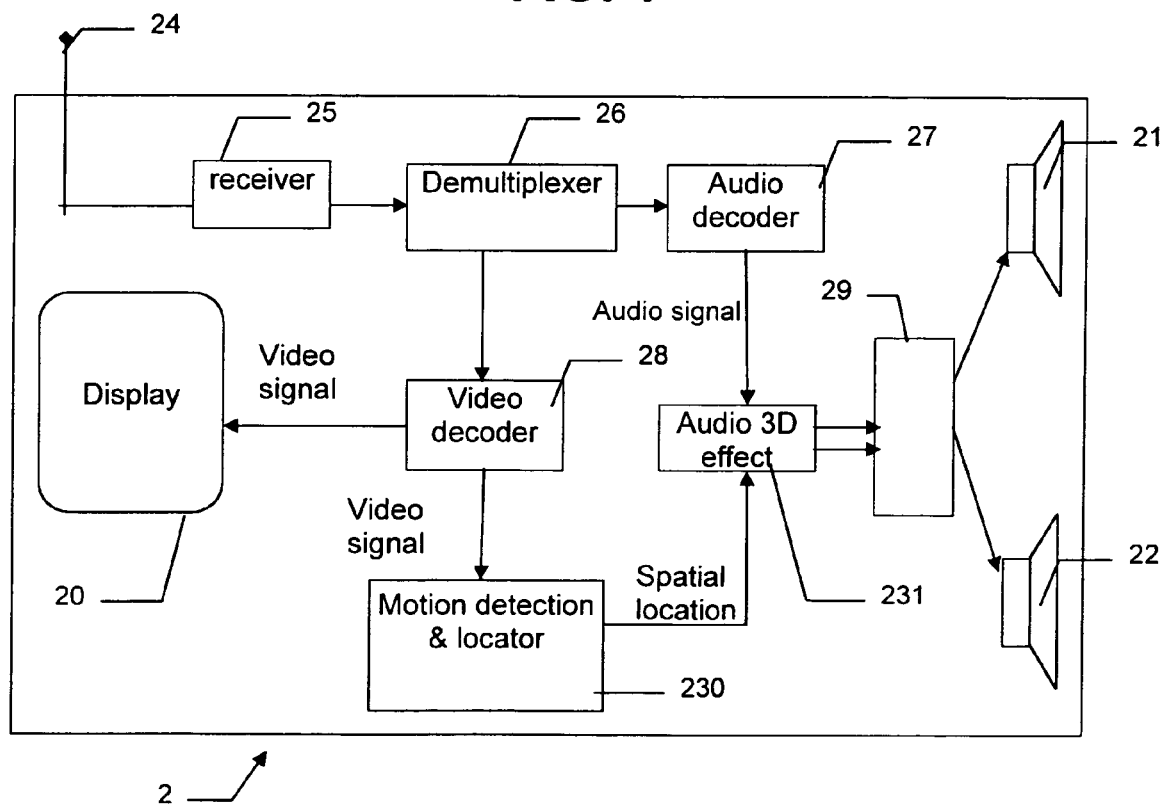
FIG. 2 shows schematically a communication apparatus, for instance the videoconference receiver of FIG. 1, in one possible embodiment according to the invention.

FIG. 2 gives some details of communication apparatus, for instance videoconference receiver 2 of FIG. 1:

Moving picture sent via link L is received via an antenna 24 on a receiver 25. Assuming both audio and video signal on the transmitter's side have been first coded, compressed and multiplexed, in relevant file format before being sent over the air, the audio video file received by receiver 25 must be classically de-multiplexed in demultiplexer 26, de-compressed and decoded respectively by audio decoder 27 and video decoder 28 in order to deliver audio and video signals. According to the method of the invention, video signal is also processed by a motion detector and locator block 230 which delivers spatial location information of at least one zone in motion inside the analyzed images. This information is given to an audio 3D effect block 31 which receives also audio signal from audio decoder 27, and which applies 3D effect as a function of spatial location information. Sounds are then delivered, through a power amplifier 29 to corresponding loudspeakers 21 and 22, with the given 3D effect. In synchronism, video signal is displayed on display 20. The mechanism of synchronization are not explicitly detailed here since a man skilled in the art will know what must be implemented in order to get a displayed image in synchronism with the sound, whatever the processing made separately on the video signal and the audio signal.

A first possible audio 3D effect can consist in adapting the relative gains of left and right loudspeakers as a function of the spatial location.

Alternatively or in combination, it can consist in adapting the relative phases and time delays of left and right loudspeakers as a function of the spatial location.

Alternatively or in combination, it can consist in adapting the frequency gain of left and/or right loudspeakers as a function of the spatial location.

The method according to the invention can also be used for a different source and scene (e.g. detection of motions in a natural scene, or use the motion of any object and focus the sound according to the motion within picture).

The invention claimed is:

1. A method for reproducing a moving picture composed of a succession of images captured by a camera and monophonic sounds captured simultaneously with said images, the method comprising:

Determining a spatial location of at least one zone in motion within said moving picture by analyzing successive images;

Identifying said zone in motion as corresponding to a source from which sound is originated;

Delivering image data to a display and corresponding monophonic sound data to at least one left loud speaker and one right loud speaker; and Reproducing said succession of images on said display and said corresponding monophonic sounds on said at least one left loud speaker and one right loud speaker, while applying to said monophonic sounds at least an audio 3D effect as a function of said spatial location.

2. A method according to claim 1, characterized in that said step of determining spatial location of at least one zone in motion further comprises the step of comparing successive images and determining at least two coordinates of said zone in a 2D-referential corresponding to displayed images.

3. A method according to anyone of the preceding claims, characterized in that said step of determining spatial location of at least one zone in motion within said moving picture comprises the step of detecting motion of mouths of people captured in the moving picture and the step of determining spatial locations of zones corresponding to detected mouth's motions.

4. A method according to claim 1, characterized in that applying to said monophonic sounds at least an audio 3D effect consists at least in adapting the relative gains of left and right loudspeakers as a function of said spatial location.

5. A method according to claim 1, characterized in that applying to said monophonic sounds at least an audio 3D effect consists at least in adapting the relative phases and time delays of left and right loudspeakers as a function of said spatial location.

6. A method according to claim 1, characterized in that applying to said monophonic sounds at least an audio 3D effect consists at least in adapting the frequency gain of left and/or right loudspeakers as a function of said spatial location.

7. Use of the method according to anyone of claims 1, 2 or 4-6 in a videoconference system, characterized in that said moving picture to be reproduced has been captured by a videoconference transmitter comprising said camera and a microphone for capturing monophonic sounds, and in that said step of determining spatial location through said step of reproducing are performed at the level of a videoconference receiver comprising said display and said left and right loudspeakers.

8. A method for reproducing a moving picture composed of a succession of images captured by a camera and monophonic sounds captured simultaneously with said images, characterized in that it comprises the following steps:

Determining spatial location of at least one zone in motion within said moving picture to be reproduced by analyzing successive images;

Identifying said zone in motion as corresponding to a source from which sound is originated; and Reproducing said succession of images on a display and corresponding sounds on at least one left loud speaker and one right loud speaker, while controlling at least one characteristic of the first and second loud speakers to provide an audio 3D effect as a function of the determined spatial location.

9. A method according to claim 8, characterized in that said step of determining spatial location of at least one zone in motion further comprises the step of comparing successive images and determining at least two coordinates of said zone in a 2D-referential corresponding to displayed images.

10. A method according to claim 8, characterized in that said step of determining spatial location of at least one zone in motion within said moving picture comprises the step of detecting motion of mouths of people captured in the moving picture and the step of determining spatial locations of zones corresponding to detected mouth's motions.

11. A method according to claim 8, characterized in that controlling the at least one characteristic of the first and second speakers as a function of the determined spatial location comprises at least adapting the relative gains of left and right loudspeakers as a function of said spatial location.

12. A method according to claim 8, characterized in that controlling the at least one characteristic of the first and second speakers as a function of the determined spatial location comprises at least adapting the relative phases and time delays of left and right loudspeakers as a function of said spatial location.

13. A method according to claim 8, characterized in that controlling the at least one characteristic of the first and second speakers as a function of the determined spatial location comprises at least adapting the frequency gain of left and/or right loudspeakers as a function of said spatial location.

14. Use of the method according to claim 8 in a videoconference system, characterized in that said moving picture to be reproduced has been captured by a videoconference transmitter comprising said camera and a microphone for capturing monophonic sounds, and in that said step of determining spatial location through said step of reproducing are performed at the level of a videoconference receiver comprising said display and said left and right loudspeakers.

15. A method according to claim 8, further comprising before the reproducing:

Delivering image data to a display and corresponding monophonic sounds to said at least one left loud speaker and one right loud speaker.

\* \* \* \* \*